(12) United States Patent
Ellis

(10) Patent No.: US 6,784,610 B2
(45) Date of Patent: Aug. 31, 2004

(54) DISPLAY PANEL APPARATUS AND METHOD

(76) Inventor: Alan D. Ellis, 65 Jami St., Livermore, CA (US) 94518

(*) Notice: Subject to any disclaimer, the term of this patent is extended or adjusted under 35 U.S.C. 154(b) by 30 days.

(21) Appl. No.: 10/230,598

(22) Filed: Aug. 29, 2002

(65) Prior Publication Data

US 2004/0041509 A1 Mar. 4, 2004

(51) Int. Cl.[7] .................................................. H01J 1/62
(52) U.S. Cl. ........................................ 313/495; 313/311
(58) Field of Search ................................ 313/499–512, 313/309, 311, 310, 495–497, 336, 351, 326, 323, 358; 445/24, 25, 50, 51

(56) References Cited

U.S. PATENT DOCUMENTS

| | | | |
|---|---|---|---|
| 6,380,670 B1 * | 4/2002 | Haven et al. ............... 313/495 |
| 6,414,847 B1 * | 7/2002 | Hutchison et al. .......... 361/704 |
| 6,417,847 B1 * | 7/2002 | Mametsuka .................. 345/213 |
| 6,420,826 B1 * | 7/2002 | Jankowski et al. ......... 313/495 |
| 6,422,906 B1 * | 7/2002 | Hofmann et al. ............. 445/24 |

\* cited by examiner

*Primary Examiner*—Joseph Williams
(74) *Attorney, Agent, or Firm*—Charles L. Thoeming (57) ABSTRACT

A panel display using gold as a conductive element and a matrix of carbon fibers as emitters is presented. The invention provides a novel defined pixel width of three emitter fibers per cell wherein each cell is positioned within three emulsion layers of suspended nano-crystals stack positioned vertically atop one-another. Each of these respective layers is excited by a single carbon fiber. In the preferred embodiment, fiber length ends from each cell are positioned at the mid-point of each respective polymer layer thickness and produce one of red, green, or blue colors required to complete the image formation.

20 Claims, 8 Drawing Sheets

DISPLAY PANEL APPARATUS AND METHOD

CROSS-REFERENCES TO RELATED APPLICATIONS

None.

STATEMENT REGARDING FEDERALLY SPONSORED RESEARCH OR DEVELOPMENT

None.

REFERENCE TO A MICRO-FICHE APPENDIX

None.

BACKGROUND OF THE INVENTION

1. Field of the Invention

The present invention relates to a panel display which uses gold as a conductive element and a matrix of carbon fibers as emitters. The invention provides a novel defined pixel width of three emitter fibers per cell. Each solo dot or cell is positioned within three emulsion layers of suspended nano-crystals stack positioned vertically atop one-another with each of these respective layers being excited by a single fiber from each cell. Each fiber length end is positioned at the mid-point of each respective polymer layer thickness and produces one of red, green, or blue color required to complete the image formation.

2. Description of the Related Art including Information Disclosed under 37 C.F.R. 1.97 and 1.98

A search of the prior art located the following United States patents which are believed to be representative of the present state of the prior art: U.S. Pat. No. 6,380,670 B1, issued Apr. 30, 2002, U.S. Pat. No. 6,414,741 B2, issued Jul. 2, 2002, U.S. Pat. No. 6,417,847 B1, issued Jul. 9, 2002, U.S. Pat. No. 6,420,826, issued Jul. 16, 2002, and U.S. Pat. No. 6,422,906 B1, issued Jul. 23, 2002.

BRIEF SUMMARY OF THE INVENTION

Conventional display panels in the art are designed from micro-tech development in the computer chip industry. This technology employs modern silicon wafer breakthroughs that over the past ten years provided the increased resolution and bright definition display monitors used throughout business and personal applications.

Much of this art is based on the encapsulated cathode ray tube to protect the screen elements from environmental exposure and resulting damage. The envelope is necessary to: (i) hold the gasses required to create discharge boundaries within the tube and outward to the responding phosphorus pixels; (ii) maintain a rigid framework for the screen; and (iii) provide a safety barrier from vacuum tube implosion. Although new, more responsive materials have been developed for displays, the basic design in the art is maintained because of the higher manufacturing costs required by the new concepts.

The present invention relates to flat panel displays which use an emulsion based light source. The light sources in the art are typically derived from metal emitters such as calcium. Calcium metal as an emitter is favored in the art due to its relatively low work function, i.e. the ability to easily release electrons, and sustain this level of electron emission without erosion. The work function of calcium is 2.0 which indicates a greater emission rate and quicker recovery time.

The metals used in the art, however, present difficulties with respect to their reactivities with water and oxygen. As such, these metal emitters in the art oxidize quickly or draw moisture or oxygen from other components of the panel displays.

The art also seeks to produce electron emission from a flat surface by applying an opposing voltage on a conductive over-coat of the emulsion. The resulting potential difference between the calcium, or other metal emitter, and the top layer of the cell causes conductance through the medium and produces photons. By doping the emulsion with certain materials, colors could be produced, particularly the primary colors, blue, red and green. Panels in the art require relatively high current to drive this process, and the necessary DC voltage tends to erode the emitter causing the pixel or cell to die.

Thus, it is an objective of the present invention to provide a flexible display panel which uses a conductive metal which is relatively inert to oxygen or moisture.

It is a further objective of the present invention to provide a flexible display panel which uses carbon fibers as emitters.

Yet another intended and desired feature of the present invention is to provide a flexible monitor which can be adapted to many more applications than monitors in the art. For example, adaptable applications for the flexible monitor are viewing screens for military tanks, military land vehicles, mobile search and detection vehicles, aircraft, helicopters, and individual apparel for image acquisition in field environments.

The flexible display panel of the present invention is adaptable to any consumer markets which use a viewing screen as well as commercial and other markets such as military, advertising, medical imaging, aviation, automobiles, appliances, and toys.

The design and development as shown below allows for the thin membrane flexible display panel to be rolled into a tube or cylinder one inch or less in diameter for storage or transport. When needed, the flexible display panel can be unrolled to an extended flat position for operation and viewing.

The concept of the present invention also lends itself to a three-dimensional imaging process by which adjacent pixel emissions are time controlled to create a depth of field to the panel image.

Yet another objective of the present invention is to provide a panel display apparatus that eliminates the need for gaps, buffers, and/or etching between the emitting elements and the color means by surrounding the emitting elements within the color means. This feature greatly reduces the costs of materials and processing steps required for panel display manufacturing.

Other features, advantages, and objects of the present invention will become apparent with reference to the following description and accompanying drawings.

BRIEF DESCRIPTION OF DRAWINGS

The accompanying drawings, which are incorporated into and form a part of the disclosure, illustrate an embodiment of the invention, and together with the description, serve to explain the principles of the invention. It should be understood that, because of the great disparity between various features depicted in the same drawing, the following drawings are not necessarily drawn to scale; it is intended that they be merely illustrative of the process.

DETAILED DESCRIPTION OF THE INVENTION

Figure 1:
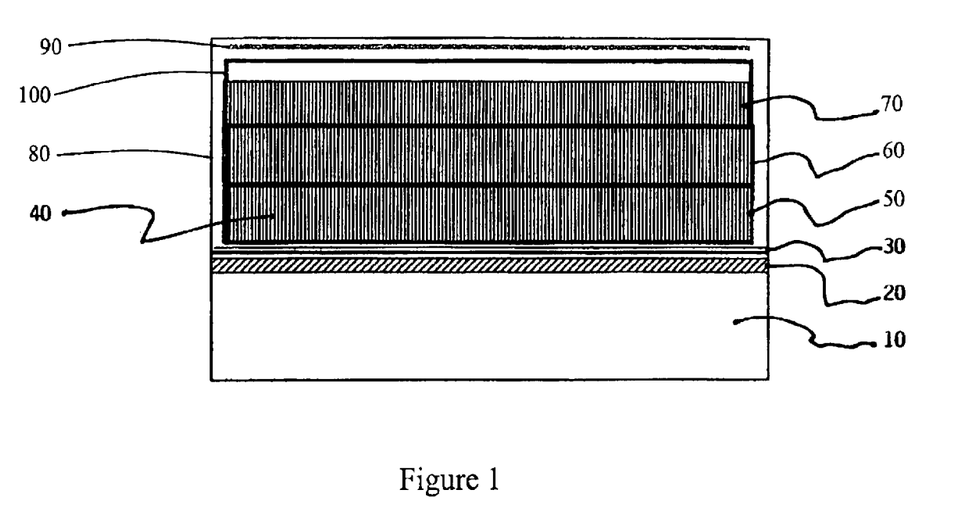
FIG. 1 is an enlarged cross-sectional view of the pixel cell layout of the present invention.
Figure 2:
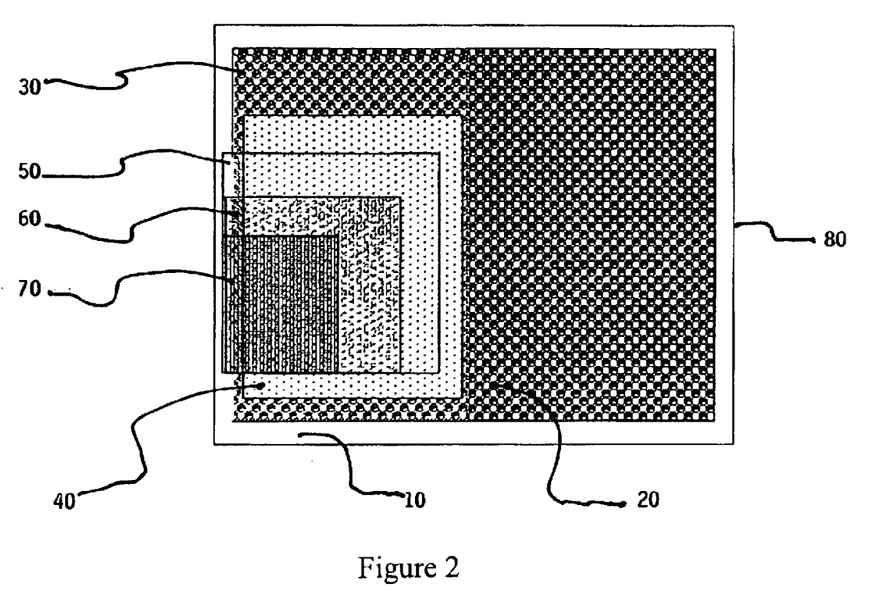
FIG. 2 is a top view of the pixel cell sequence.

The flexible panel display of the present invention provides use of the novel single point, three-color pixel with increased resolution of over sixty (60%) percent over display in the art. As depicted in FIGS. 1 and 2, the panel of the preferred embodiment of the present invention comprises polyester film substrate, similar to the product sold under the mark Mylar®, or polymer substrate 10 which is coated with a driver transistor matrix 20, a gold conductive layer 30, micro carbon fiber emitters 40, three light emitting polymer layers 50, 60, and 70, each having a field charge overcoat 100, and finally an encapsulation layer 80 that serves as the outer protective casing of the panel, including the panel faceplate and backplate.

The subtrate 10 functions as an insulator and support base for the matrix structure and panel membranes which are layered upon the substrate surface. It is also the back surface of the panel display. The substrate 10 is also the supporting membrane for the panel that will maintain the character and structure of the pixel matrix. This membrane can be comprised of polymer, glass, ceramic, silicon, and metal depending on the panel end use. In less rigorous environments the polymer, glass, and silicon would be suitable. In rugged or industrial environments the ceramic or metal substrate would be used.

For environments requiring flexibility, such as laptop computer displays, in-home theaters, and automobiles, the polymer film substrate would be used to minimize weight and to maximize application flexibility and durability. As such, the polymer film substrate would be used in unlikely areas such as bathrooms, showers, and kitchens so as to easily clean the viewer with the wipe of a cloth without damaging the screen surface. The substrate thickness would determine its application and would be in a range of 1 to 4 millimeters.

The driver transistor matrix 20, FIGS. 1 and 2, is disposed on the substrate by a chemical vapor deposition process to establish the pixel pattern of the flexible panel. The chemical vapor deposition of the driver transistor matrix is in a multi-layer configuration applied using a photo lithography mask and etch process. Utilizing ultra-violet masking the line width and line resolution makes it possible to align overlaying coatings that comprise the structure of the transistor matrix 20 and to align the gold conductive layer 30 prior to applying the carbon emitter fibers 40. This driver transistor matrix 20 is matched to the matrix design of the carbon fiber emitter 40 pattern to provide maximum control and resolution to the pixel image. Additionally, this method is critical to stabilize energizing of the emitter array. The circuitry of the driver transistor matrix is designed to minimize device failure. Accordingly, when one matrix transistor fails the adjacent transistor double fires so that the panel will show no dead spots on the viewing portion of the display. In this fashion, the lifetime of the display is extended.

The transistor matrix pattern 20 of the preferred embodiment of the present invention is then over-coated with a conductive layer of gold 30 approximately 500 Å. The gold conductive layer 30 is the trigger base or cathode for the micro carbon emitter fibers 40. The gold over-coating process requires photo resist masking to achieve proper coating alignment. The photo resist masking ensures that the conductive overcoat will only be deposited on the transistor matrix point, minimizing bridging of the pixel and cross matrix crossfire. Accordingly, the dead zones within the viewing area of the screen are significantly reduced. Alternate metallic conductive layers known in the art, such as silver or Nichrome, may be substituted for gold; however, gold provides superior anti-oxidizing properties over these substitutes.

The carbon emitter fibers 40 are impact welded to the gold conductive layer 30. Impact welding is critical to this method since it allows the emitter fibers to bend a certain radius and return to their upright position when required. This feature allows the panel to flex and to be shaped or formed to a surface contour, or rolled into a cylindrical shape or tube, and still maintain the ability to function as a display.

In the preferred embodiment of the present invention, the carbon emitter fibers 30 are 2–5$\mu$ in diameter and 100 to 300$\mu$ in length. These carbon emitter fibers are initially aligned perpendicularly to the substrate 10. The shape of the carbon emitter fibers is critical to maximize the fiber's emitter function and to minimize fiber erosion. In the preferred embodiment of the present invention, the carbon emitter fibers are formed in a circular matrix pattern and are connected to the corresponding transistor matrix pattern. This feature maximizes control of each pixel or dot and greatly reduces ghosting. As such, placement of the carbon emitter fibers is critical to pixel dynamics and must be specified for the construction of each panel size. The end of the carbon fibers not welded to the conductive layer are tip coated with a hardened calcium metal to enhance the emitting effect of the fibers and lower the work function of the emitter allowing free electron emission. This design is critical to enhance the skin affect of the conductor resulting in an electron pump process to the tip of each fiber.

Figure 3:
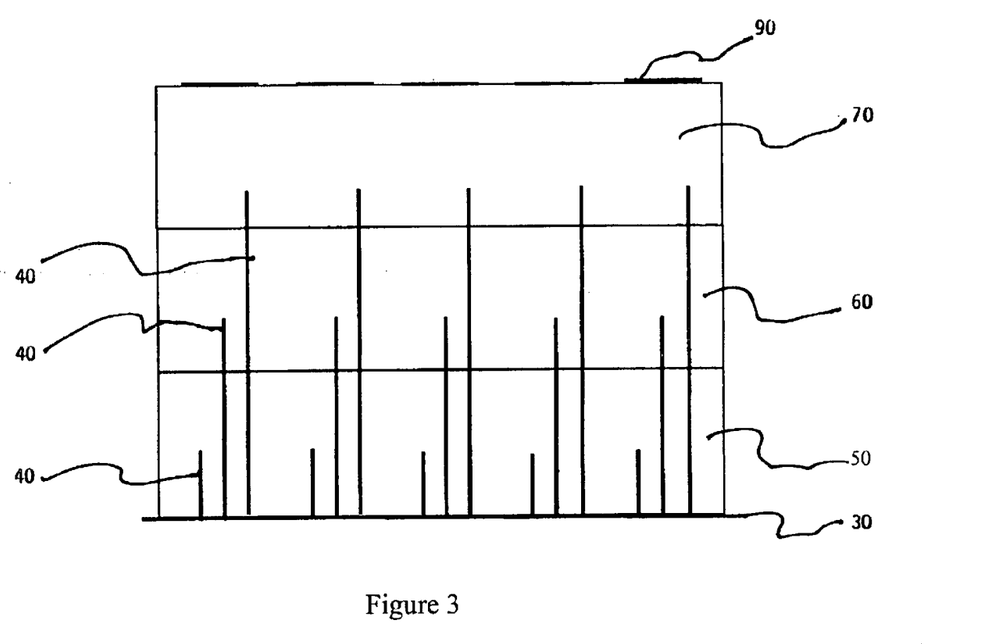
FIG. 3 is an enlarged cross-section of the pixel cell structure.
Figure 4:
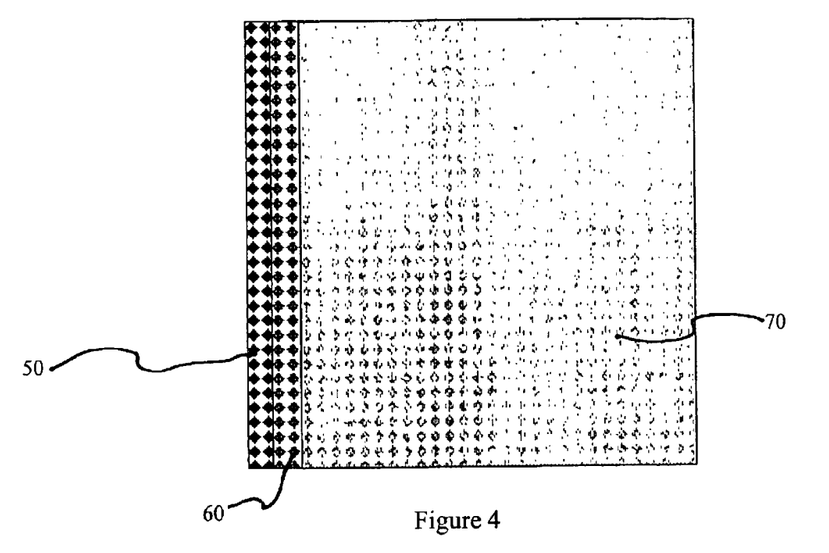
FIG. 4 is a top view of the pixel cell matrix structure.
Figure 4A:
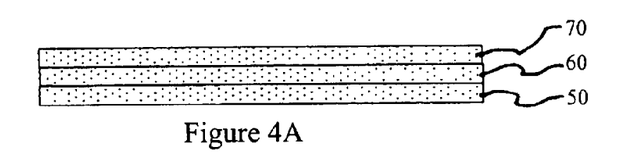
FIG. 4A is a side view of the pixel cell matrix structure.

The dot or pixel width is defined by the arrangement of the carbon emitter fibers in a group of three per pixel as depicted in FIGS. 3 and 4. Accordingly, dot or pixel width is a function of this spacing of carbon emitter fibers. By setting the pixels in a three-point arrangement, FIG. 3, with nominal offset, ghosting is virtually eliminated. Since this feature provides only one translucent structure from which the three required colors are produced it is referred to herein as the "solo" dot or pixel cell.

Figure 5:
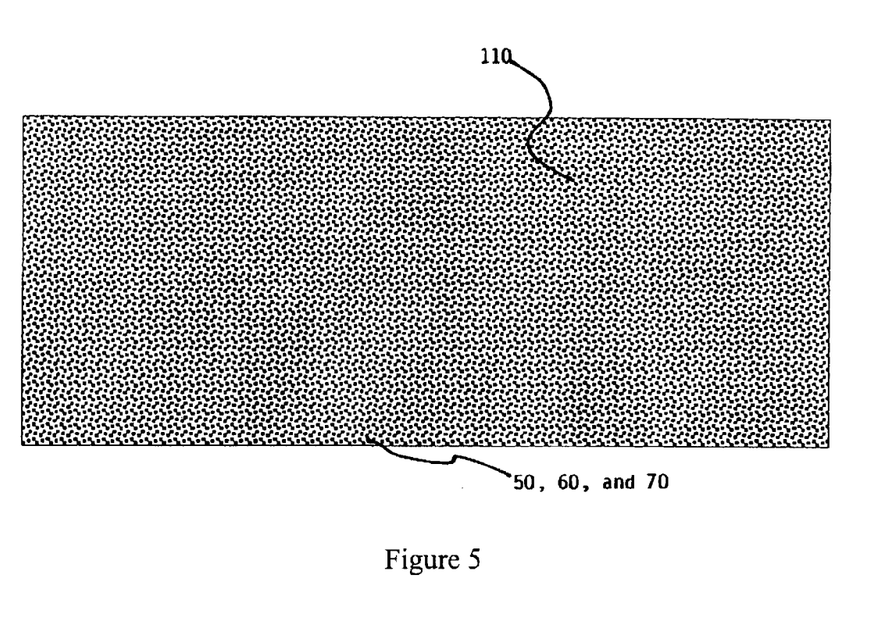
FIG. 5 is a top view of a polymer layer and nano-crystal suspension.

In the preferred embodiment of the present invention, light emitting polymer, nano crystal specific emulsion layers, 50, 60, and 70, are disposed on the carbon emitter fiber 40 structure layers and each such layer is perpendicularly connected at the thickness mid-point of the respective layer to a metallic-tipped end of the corresponding carbon emitter fiber layer from each cell. Each light emitting polymer, nano crystal specific emulsion layer is over-coated with a conductive layer of Indium-Tin Oxide, which functions as a gate electrode 100 for each polymer layer, FIG. 6. Each polymer layer, 50, 60, and 70, during fabrication is injected with nano-crystals 110 which when processed become neutrally suspended within the polymer layer 50, 60, and 70, in an even dispersion pattern, FIG. 5.

In the preferred embodiment of the present invention, the solo dot or pixel cell consists of three layers of a special emulsion or Aero-gel within which the coloring nano-crystals are suspended. The nano-crystals are suspended within the layer by a proprietary process to equalize placement of the crystals as reflected in FIG. 5. Such suspension enhances a truer color balance across each solo dot providing a lifelike contrast to the image.

Figure 6:
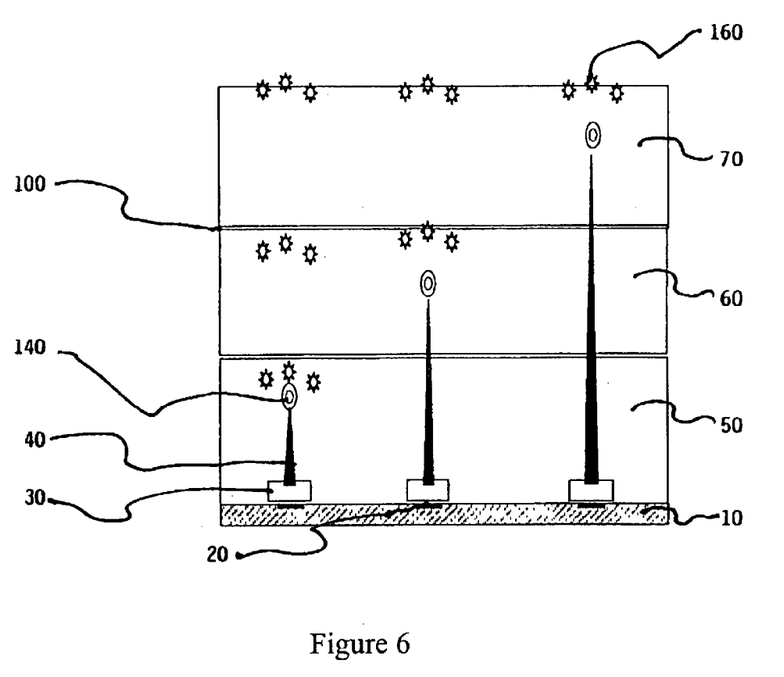
FIG. 6 is a an enlarged cross-section of pixel color production process.

Referring to FIGS. 3 and 6, the bottom layer 50 of the solo dot stack is a blue layer. Since blue is the most difficult color to develop and the brightest of the three colors it is positioned at the bottom. It is critical that the specific color frequency range of the blue layer is 540–580 nano-meters to obtain the necessary 100,000 to 1,000,000 colors. Red is the next layer 60, and the top layer 70 is green. Each layer is approximately $100\mu$ to 1.5 mm thick, and has a selection of emitter carbon fiber metallic-tipped ends positioned within it at the mid-point thickness of the layer as depicted in FIG. 3. When the control circuit energizes that matrix dot of fibers, the particular layer illuminates creating its portion of the color mix. Hue and contrast are controlled by the intensity of the electron emission into each layer of the solo dot. When this process is combined across the matrix, an image is formed.

Figure 7:
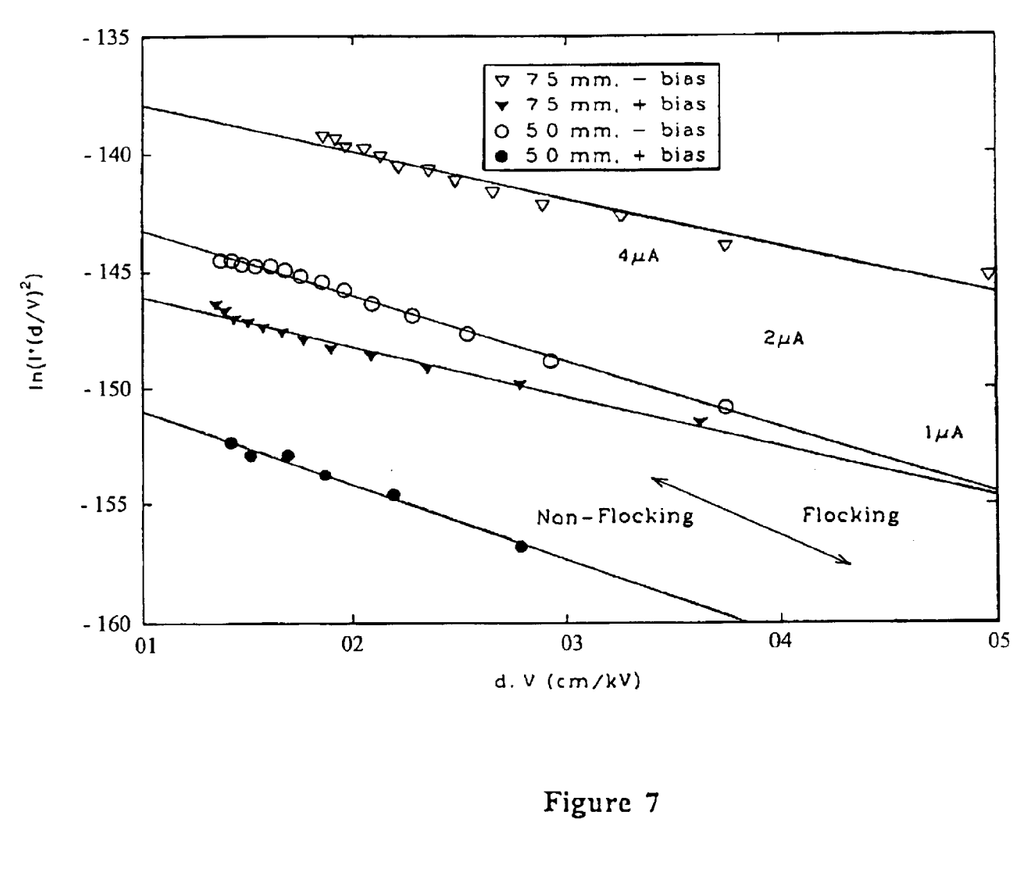
FIG. 7 is a plot of current-voltage data to show the fit to the Fowler-Nordhiem equation.
Figure 8:
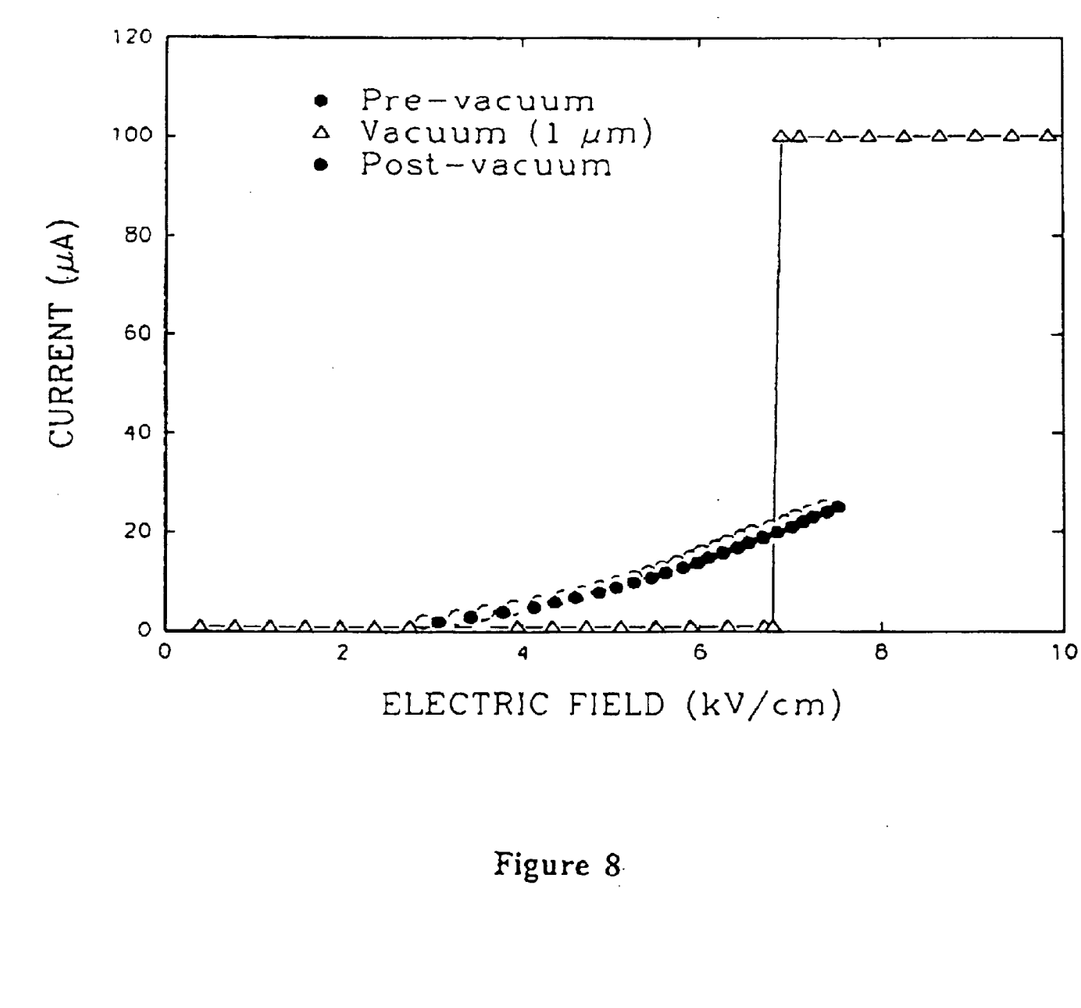
FIG. 8 is a plot of current-electronic filed data under varying pressure parameters.

These emulsion layers are bonded together by a proprietary vacuum adhesive process to eliminate air entrapment between layers. When these three layers are attached to the carbon emitting fibers, each fiber is held in position for pixel placement and, for the preferred embodiment of the present invention, each metallic-coated fiber end is connected to its corresponding emitting polymer, nano-crystal specific emulsion layer at the mid-point of the respective emulsion layer thickness. Thus, when the transistor matrix 20 triggers each carbon emitter fiber 40, an electron 140 is emitted into the corresponding emitting polymer, nano-crystal specific emulsion layer 50, 60, and 70, thus generating a color. As depicted in FIG. 6, the resulting photon 160 travels through the medium towards the gate cathode 100 and exits the front surface of the panel as a pixel color. Color mixing is accomplished at each dot or pixel point which, when added to surrounding color pixels, creates a transmitted image. This contact surround of emitter carbon fibers within the corresponding emulsion layer eliminates the gapping, buffering, and/or etching requirements of the art and, thus, provides demonstrable manufacturing efficiencies. As shown in FIGS. 7 and 8, when current exceeds 1 $\mu$Å, fiber flocking halts. Pre-breakdown emission current from a 33 $\mu$m×5000 $\mu$m carbon fiber is pronounced in air, but is suppressed in moderate vacuum until the onset of glow discharge.

The emulsion is of a base chemistry to allow electron passage to the forward cathode position to maximize illumination of the suspended nano-crystals within the layers. This process of illumination allows for complete mix of color to the forward surface of the cell, giving total pixel definition to the screen. The visual angle of the image is correspondingly maximized to 160 degrees, since the image is produced at the surface of the screen, unlike monitors and panels in the art which employ thick face plates or screen to keep the envelope from imploding if damaged.

A cathode layer 90 is coated over the top of the cell to present a negative charge field to which the electrons flow. In the preferred embodiment, 200 Å ITO gating cathodes are used. The charge/discharge process of the solo dot matrix is thus completed.

The cell panel is encapsulated in any waterproof layer known in the art. The preferred embodiment of the present invention comprises Parylene N, which provides an excellent moisture barrier against the atmosphere, as the waterproof layer. As such, the panel of the present invention can be used for underwater military or commercial uses.

As to the manner of usage and operation of the display panel, and the means of electrical power necessary to drive the present invention, the same should be apparent from the above description and the art. Accordingly, no further discussion relating to the manner of usage, operation, or means to power the present invention will be provided.

Although the invention has been described in some detail with reference to the preferred embodiment and alternatives, those of skill in the art will realize, in light of the teachings herein, that certain changes and modifications can be made without departing from the spirit and scope of the invention. Accordingly, the invention is limited only be the claims.

I claim:

1. A panel display, comprising:
   a faceplate;
   a backplate;
   a substrate disposed on the backplate;
   a driver transistor matrix layer disposed on the substrate;
   a conductive layer disposed on the driver transistor matrix;
   an emitter matrix layer of carbon fibers perpendicularly disposed on the conductive layer, wherein the emitter matrix matches the driver transistor matrix;
   at least one light emitting polymer layer disposed on the emitter layer wherein the carbon fibers are perpendicularly aligned within each such layer; and
   means to encapsulate the panel display in a waterproof layer.

2. The panel display of claim 1, wherein the substrate, faceplate, and backplate further comprise mylar.

3. The panel display of claim 1, wherein the substrate, faceplate, and backplate further comprise a polymer.

4. The panel display of claim 1, wherein the transistor matrix pattern is disposed on the substrate by chemical vapor deposition.

5. The panel display of claim 1, wherein the conductive layer further comprises gold.

6. The panel display of claim 1, wherein the conductive layer further comprises Nichrome.

7. The panel display of claim 1, wherein the conductive layer further comprises silver.

8. The panel display of claim 5, wherein the gold conductive layer is approximately 500 Å in thickness.

9. The panel display of claim B, wherein the 500 Å gold conductive layer is disposed on the driver transistor matrix by photo resist masking.

10. The panel display of claim 1, wherein the emitter matrix layer of carbon fibers further comprises carbon emitter fibers having two ends, wherein one end of each fiber is impact welded to the conductive layer to form molecular bonding between the emitter fibers and the conductive layer.

11. The panel display of claim 10, wherein the carbon emitter fibers are 2 to $5\mu$ wide and 100 to $300\mu$ in length, and wherein the carbon fibers are arranged in group sets of three per pixel.

12. The panel display of claim 10, wherein the carbon emitter fiber ends which are not impact welded to the conductive layer are tip coated with a hardened calcium metal.

13. The panel display of claim 10, wherein the conductive layer is a 500 Å gold layer.

14. The panel display of claim 1, wherein each light emitting polymer layer is over-coated with a conductive layer of Indium-Tin Oxide.

15. The panel display of claim 13, further comprising three coated light emitting polymer layers, each 100μ to 1.5 mm thick, bonded together to form a top, middle, and bottom, and wherein the bottom layer contains blue nano-crystals with a frequency range of 540 to 580 nano-meters, the middle layer contains red nano-crystals, and the top layer contains green nano-crystals.

16. The panel display of claim 11, further comprising three coated light emitting polymer layers wherein each light emitting polymer layer is over-coated with a conductive layer of Indium-Tin Oxide and the resulting coated layers are bonded together to form a top, middle, and bottom, wherein the bottom layer contains blue nano-crytals with a frequency range of 540 to 580 nano meters, the middle layer contains red nano-crystals, and the top layer contains green nano-crystals, and wherein each light emitting polymer layer is perpendicularly connected at the mid-point thickness of the respective layer to a separate carbon emitter fiber, calcium coated tip from each group set of carbon fibers per pixel width.

17. The panel display of claim 1, wherein means to encapsulate the panel display in a waterproof layer further comprises transparent Parylene N.

18. The panel display of claim 1, wherein the backplate further comprises electronics to provide the necessary current to drive the panel display.

19. The panel display of claim 1, wherein the faceplate further comprises Niobium cathodes 200 Å thick.

20. The panel display of claim 11, wherein adjacent pixel emissions are Lime controlled to create a depth of field to the panel image.

* * * * *